United States Patent
Turner

[15] 3,705,196
[45] Dec. 5, 1972

[54] SYNTHESIS OF ALIPHATIC AND ALICYCLIC ETHERS

[72] Inventor: John O. Turner, West Chester, Pa.

[73] Assignee: Sun Oil Company, Philadelphia, Pa.

[22] Filed: Oct. 31, 1969

[21] Appl. No.: 873,094

[52] U.S. Cl. ..........................260/611 R, 260/614 R
[51] Int. Cl..............................................C07c 41/10
[58] Field of Search............260/610 R, 614 R, 611 R

[56] References Cited

UNITED STATES PATENTS

| | | |
|---|---|---|
| 2,403,758 | 7/1946 | Rust et al. ...............260/610 R |
| 2,403,771 | 7/1946 | Vaughan et al. ........260/610 R |
| 3,337,639 | 8/1967 | Stedehouder et al. ..260/610 R |

*Primary Examiner*—Bernard Helfin
*Attorney*—George L. Church, Donald R. Johnson, Wilmer E. McCorquodale, Jr. and Stanford M. Back

[57] ABSTRACT

Aliphatic and alicyclic hydroperoxides and peroxides in the presence of a suitable alcohol and acid catalyst are converted to the corresponding ethers.

7 Claims, No Drawings

SYNTHESIS OF ALIPHATIC AND ALICYCLIC ETHERS

BACKGROUND OF THE INVENTION

This invention relates to a novel process for the preparation of aliphatic and alicyclic ethers. More particularly, this invention relates to a process for the preparation of aliphatic and alicyclic ethers by reacting the corresponding hydroperoxide or peroxide with a suitable alcohol in the presence of an acid catalyst.

Leffler, Chem. Revs. 45, 385 (1949) mentions the preparation of isobutylene as the sole product in the decomposition of t-butylhydroperoxide with acid. In a related work, Davies et al., J. Chem. Soc., 2204 (1954), reports the preparation of aralkyl peroxides by the acid-catalyzed decomposition of the corresponding hydroperoxides. Maslennikov et al., Tr. Khim. i Khim. Terhnol., 59 (1965), on the other hand, teach the decomposition of t-butylhydroperoxide with benzenesulfonic acid to form acetone and methanol.

Thus, nowhere in the known literature is there any suggestion that ethers may be prepared from hydroperoxides or peroxides. On the contrary, only two well-known methods for the preparation of aliphatic ethers are recognized today: (1) the reaction of an alkyl halide with an alkali metal alkylate, and (2) the reaction of an olefin with an alcohol in acid.

SUMMARY OF THE INVENTION

In accordance with the present invention, it has now been found that aliphatic and alicyclic ethers may be prepared by reacting the corresponding hydroperoxide or peroxide with a suitable alcohol in the presence of an acid catalyst.

DESCRIPTION OF THE INVENTION

This process is conveniently carried out by simply mixing the desired hydroperoxide or peroxide starting material in a suitable alcoholic acid medium for about 4 to 40 hours, and preferably from 10 to 20 hours, depending upon the nature of the starting material, the concentration of the acid, etc., and recovering the resulting ether.

For optimum results, it is important that the ratios of the hydroperoxide or peroxide starting material, the acid, and the selected alcohol be kept within certain ranges. Thus, the amount of alcohol should be present in a two-to-twelve-fold molar excess, based on the moles of the hydroperoxide or peroxide starting material, and preferably from about a seven-to-ten-fold molar excess of the alcohol.

The amount of acid should, in turn, be based on the amount of alcohol present in order to provide a 30 to 65 weight percent concentration of acid based on the total weight of the acid/alcohol mixture. The preferred weight percent of acid is about 50 to 55 percent. In carrying out this reaction, it has been found to be particularly advantageous, after removing the ether from the reaction mixture, to recycle the acid to the reaction medium after addition of sufficient alcohol to readjust the acid concentration, thereby enhancing the yield of ether which is otherwise entrapped with the acid.

The acid employed should be a concentrated acid, as for example hydrochloric, phosphoric, polyphosphoric, sulfuric, perchloric, various sulfonic acids or the like, as well as acid-treated molecular sieves, and preferably sulfuric acid.

The alcohol is desirably a lower aliphatic alcohol having from one to four carbon atoms. Of these, methanol is preferred. However, depending upon the alkyl moiety desired in forming the resulting ether, other alcohols may be employed instead. Thus, for example, if ethyl t-butyl ether is desired rather than methyl t-butyl ether, then ethanol should be selected in place of methanol as the reactant.

The temperature employed in effecting this reaction should desirably be from about 20° to 80° C, and preferably from 50° to 60° C.

The hydroperoxides and peroxides employed as starting materials in this process include both aliphatic and alicyclic compounds which may have anywhere from three to 12 carbon atoms.

The hydroperoxides may be either secondary or tertiary compounds, although the latter type are more reactive and more effectively employed than are the secondary compounds. Typical amongst the aliphatic compounds which may be employed are such compounds as t-butylhydroperoxide, or sec.-butylhydroperoxide, and the corresponding peroxides, as well as such alicyclic compounds as 1-methylcyclopentyl and 1-methylcyclohexyl hydroperoxide or peroxide, and the like.

When these and similar hydroperoxides or peroxides are treated in accordance with this process there are obtained the corresponding aliphatic and alicyclic ethers such as alkyl t-butyl ether, alkyl sec.-butyl ether, 1-methylcyclopentyl alkyl ether, and the like.

While applicant does not wish to be bound by any particular theories concerning the mechanism of his reaction, it is believed that when the hydroperoxide is employed as the starting material some of it is converted into the corresponding peroxide which, in turn, is then decomposed to form the desired ether. Evidence for this is found in the recovery of peroxide from the reaction medium within relatively short periods after the reaction has commenced, i.e., within about the first 10 hours. The peroxide does, however, disappear with time as the amount of ether increases.

Thus it will be evident that when the hydroperoxide is used as the starting material the reaction conditions of time, temperature and acid concentration may be varied somewhat within their given parameters to change the rate at which the ether is recovered, and the amount of peroxide intermediate which is formed. The rate at which peroxide is converted to an ether, either as a starting material or as an intermediate will likewise be affected except that the reaction time will, of course, be somewhat less than that for a comparable amount of hydroperoxide. Generally speaking, the rate in either case will increase with temperature and acid concentration. It will also be evident from the foregoing that mixtures of hydroperoxides and peroxides may be employed as the starting materials for this process.

The following examples illustrate the invention.

EXAMPLE 1

Nine grams (0.1 moles) of t-butylhydroperoxide was slowly added to a solution of 36.3 grams of 96 percent sulfuric acid in 29.7 grams of methanol. The solution was stirred for 18 hours at 50°C at atmospheric pressure.

The product was collected by stripping the reaction solution under reduced pressure. Analysis showed it to be 4.4 grams (0.05 moles) of methyl t-butyl ether, 1.48 grams (0.02 moles) of methyl acetate and 10.0 grams of methyl alcohol.

EXAMPLE 2

The procedure of Example 1 as applied to 14.6 grams (0.1 mole) of dimethylneopentyl hydroperoxide yields 2.9 grams (0.02 mole) of the corresponding methyl ether.

EXAMPLE 3

The procedure of Example 1 as applied to 5.8 grams (0.05 mole) of 1-methylcyclopentyl hydroperoxide in MeOH-$H_2SO_4$ yields 1.24 grams (0.01 mole) of the corresponding methyl ether.

EXAMPLE 4

The procedure of Example 1 as applied to 9 grams (0.1 mole) of t-BuOOH in 50 weight percent solution of 96 percent $H_2SO_4$ in ethanol yields 2.45 grams (0.024 mole) of ethyl t-butyl ether.

EXAMPLE 5

In accordance with the procedure of Example 1 a solution made up of 90 grams of 100 percent phosphoric acid in 50 grams of methanol was heated with 9 grams (0.1 mole) of t-butylhydroperoxide. The reaction was stirred for 18 hours at 70°C and yielded 0.049 moles of methyl t-butyl ether.

EXAMPLE 6

In accordance with the procedure of Example 1 a solution made up of 58 grams of p-toluene sulfonic acid in 60 grams of isopropanol was treated with 9 grams (0.1 mole) of t-butylhydroperoxide. The reaction was stirred at 60°C for 60 hours to yield 4.4 grams (0.038 mole) of isopropyl t-butyl ether.

EXAMPLE 7

Three separate runs were carried out as shown in the following table wherein 7.3 grams (0.05 mole) of di-t-butylperoxide was stirred in a 50 percent methanolic sulfuric acid at 50°C under varying conditions. The methanolic sulfuric acid medium was formed by mixing 33 grams of methanol with 33 grams of concentrated sulfuric acid. The final product, methyl t-butyl ether, was recovered by reduced pressure distillation.

TABLE 1

| Reaction | temp. °C. | time hr. | % $H_2SO_4$ | wt. acid soln. g. | % t-$Bu_2O_2$ recovered | % tBuOMe |
|---|---|---|---|---|---|---|
| 1 | 50 | 18 | 50 | 66 | 25 | 44 |
| 2 | 50 | 40 | 50 | 66 | 0 | 65 |
| 3 | 50 | 72 | 50 | 66 | 0 | 50 |

What is claimed is:

1. A process for the preparation of aliphatic or alicyclic ethers which comprises reacting a secondary or tertiary aliphatic or alicyclic hydroperoxide or peroxide having from three to 12 carbon atoms with a $C_{1-4}$ primary or secondary alcohol in the presence of an acid catalyst selected from the group consisting of hydrochloric, phosphoric, polyphosphoric, sulfuric, perchloric and sulfonic acids, and acid-treated molecular sieves, at a temperature of from about 20° to 80°C, wherein said alcohol is present in amounts of at least two molar excess based on the weight of the peroxide or hydroperoxide starting material and wherein the acid concentration is from about 30 to 65 weight percent based on the weight of the acid-alcohol mixture.

2. The process according to claim 1 wherein the acid concentration is from about 50 to 55 weight percent based on the weight of the acid-alcohol mixture.

3. The process according to claim 1 wherein the alcohol is methanol.

4. The process according to claim 1 wherein the alcohol is present in a seven-to-ten fold molar excess based on the number of moles of the hydroperoxide or peroxide starting material.

5. The process according to claim 1 wherein the starting material is t-butylhydroperoxide or t-butylperoxide, the alcohol is methanol and the product is methyl t-butylether.

6. The process according to claim 1 wherein the reaction is carried out for at least 4 hours.

7. The process according to claim 1 for the production of methyl t-butylether which comprises reacting t-butylhydroperoxide or t-butylperoxide or mixtures thereof with a 50 to 55 weight percent of methanolic sulfuric acid solution at about 50° to 55°C for at least about 4 hours, said methanol being present in a molar excess of at least twice the number of moles of said hydroperoxide or peroxide starting material.

* * * * *